(12) United States Patent
Chaivipas

(10) Patent No.: US 9,531,568 B2
(45) Date of Patent: Dec. 27, 2016

(54) SIGNAL TRANSMISSION SYSTEM

(71) Applicant: FUJITSU LIMITED, Kawasaki-shi, Kanagawa (JP)

(72) Inventor: Win Chaivipas, Bangkok (TH)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/867,363

(22) Filed: Sep. 28, 2015

(65) Prior Publication Data

US 2016/0020924 A1 Jan. 21, 2016

Related U.S. Application Data

(63) Continuation of application No. PCT/JP2013/060004, filed on Apr. 1, 2013.

(51) Int. Cl.
*H04B 1/38* (2015.01)
*H04L 5/16* (2006.01)
*H04L 25/02* (2006.01)

(52) U.S. Cl.
CPC ......... *H04L 25/028* (2013.01); *H04L 25/0272* (2013.01); *H04L 25/0292* (2013.01)

(58) Field of Classification Search
CPC ............... H04L 25/028; H04L 25/0272; H04L 25/0292; H04L 5/20; G06F 13/4295
USPC ...... 375/219, 220, 222, 259; 341/56; 327/63
See application file for complete search history.

(56) References Cited

U.S. PATENT DOCUMENTS

| | | | |
|---|---|---|---|
| 5,692,021 A | 11/1997 | Walker | |
| 5,805,087 A | 9/1998 | Walker | |
| 6,278,740 B1 * | 8/2001 | Nordyke | .......... H04L 5/20 327/63 |
| 6,459,331 B1 | 10/2002 | Takeuchi et al. | |
| 7,339,502 B2 * | 3/2008 | Furtner | ........ G06F 13/4295 341/55 |
| 2003/0011500 A1 | 1/2003 | Takeuchi et al. | |
| 2004/0054830 A1 | 3/2004 | Craft et al. | |
| 2006/0197695 A1 | 9/2006 | Takeuchi et al. | |

FOREIGN PATENT DOCUMENTS

| | | |
|---|---|---|
| JP | 07-202710 | 8/1995 |
| JP | 11-088182 | 3/1999 |
| JP | 2004-104797 | 4/2004 |

OTHER PUBLICATIONS

International Search Report and Written Opinion of the International Searching Authority (Form PCT/ISA/210, Form PCT/ISA/237), mailed in connection with PCT/JP2013/060004 and mailed May 21, 2013, partial English translation (6 pages).

* cited by examiner

*Primary Examiner* — Phuong Phu
(74) *Attorney, Agent, or Firm* — Fujitsu Patent Center

(57) ABSTRACT

A signal transmission system includes a transmitter configured to encode a transmission signal to generate 2N (N: integer larger than or equal to two) binary signals among which a number of 0s and a number of 1s are equal to each other, and to transmit the 2N binary signals, 2N signal lines configured to transmit the 2N binary signals, respectively, and a receiver configured to detect a bit pattern among a plurality of possible bit patterns of the 2N binary signals in response to a plurality of differential components between 2N received signals received through the 2N signal lines, and to decode the detected bit pattern.

3 Claims, 19 Drawing Sheets

| OUTPUT_DATA (5-BIT WIDTH) | | 6 SENARY | d0 OUTPUT_DATA2 (3-BIT WIDTH) | d1 OUTPUT_DATA2 (3-BIT WIDTH) | d0 ENCODING RESULT (4-BIT WIDTH) | d1 ENCODING RESULT (4-BIT WIDTH) |
|---|---|---|---|---|---|---|
| 0 | 00000 | 00 | 000 | 000 | 1010 | 1010 |
| 1 | 00001 | 11 | 001 | 001 | 0101 | 0101 |
| 2 | 00010 | 22 | 010 | 010 | 1001 | 1001 |
| 3 | 00011 | 33 | 011 | 011 | 0110 | 0110 |
| 4 | 00100 | 44 | 100 | 100 | 0011 | 0011 |
| 5 | 00101 | 55 | 101 | 101 | 1100 | 1100 |
| 6 | 00110 | 01 | 000 | 001 | 1010 | 0101 |
| 7 | 00111 | 12 | 001 | 010 | 0101 | 1001 |
| 8 | 01000 | 23 | 010 | 011 | 1001 | 0110 |
| 9 | 01001 | 34 | 011 | 100 | 0110 | 0011 |
| 10 | 01010 | 45 | 100 | 101 | 0011 | 1100 |
| 11 | 01011 | 50 | 101 | 000 | 1100 | 1010 |
| 12 | 01100 | 02 | 000 | 010 | 1010 | 1001 |
| 13 | 01101 | 13 | 001 | 011 | 0101 | 0110 |
| 14 | 01110 | 24 | 010 | 100 | 1001 | 0011 |
| 15 | 01111 | 35 | 011 | 101 | 0110 | 1100 |
| 16 | 10000 | 40 | 100 | 000 | 0011 | 1010 |
| 17 | 10001 | 51 | 101 | 001 | 1100 | 0101 |
| 18 | 10010 | 03 | 000 | 011 | 1010 | 0110 |
| 19 | 10011 | 14 | 001 | 100 | 0101 | 0011 |
| 20 | 10100 | 25 | 010 | 101 | 1001 | 1100 |
| 21 | 10101 | 30 | 011 | 000 | 0110 | 1010 |
| 22 | 10110 | 41 | 100 | 001 | 0011 | 0101 |
| 23 | 10111 | 52 | 101 | 010 | 1100 | 1001 |
| 24 | 11000 | 04 | 000 | 100 | 1010 | 0011 |
| 25 | 11001 | 15 | 001 | 101 | 0101 | 1100 |
| 26 | 11010 | 20 | 010 | 000 | 1001 | 1010 |
| 27 | 11011 | 31 | 011 | 001 | 0110 | 0101 |
| 28 | 11100 | 42 | 100 | 010 | 0011 | 1001 |
| 29 | 11101 | 53 | 101 | 011 | 1100 | 0110 |
| 30 | 11110 | 05 | 000 | 101 | 1010 | 1100 |
| 31 | 11111 | 10 | 001 | 000 | 0101 | 1010 |

| | D(R1-R2) | D(R1-R3) | D(R1-R4) | D(R2-R3) | D(R2-R4) | D(R3-R4) |
|---|---|---|---|---|---|---|
| 1010 | 1 | y | 1 | -1 | x | 1 |
| 0101 | -1 | x | -1 | 1 | y | -1 |
| 1001 | 1 | 1 | y | x | -1 | -1 |
| 0110 | -1 | -1 | x | y | 1 | 1 |
| 0011 | x | -1 | -1 | -1 | 1 | y |
| 1100 | y | 1 | 1 | 1 | 1 | x |

| | D[(R2−R1)+(R2−R3)+(R2−R4)] | D[(R3−R1)+(R3−R2)+(R3−R4)] | D[(R4−R1)+(R4−R2)+(R4−R3)] |
|---|---|---|---|
| 1010 | −1 | | 1 |
| 0101 | 1 | 1 | −1 |
| 1001 | 1 | −1 | −1 |
| 0110 | −1 | 1 | 1 |
| 0011 | 1 | −1 | 1 |
| 1100 | −1 | 1 | −1 |

FIG.20

| |
|---|
| 000111 |
| 111000 |
| 001101 |
| 001110 |
| 110001 |
| 110010 |
| 110101 |
| 110110 |
| 010011 |
| 011100 |
| 010101 |
| 010110 |
| 011001 |
| 011010 |
| 100011 |
| 101100 |
| 100101 |
| 100110 |
| 101001 |
| 101010 |

SIGNAL TRANSMISSION SYSTEM

CROSS-REFERENCE TO RELATED APPLICATIONS

This application is a continuation application of International Application PCT/JP2013/060004 filed on Apr. 1, 2013 and designated the U.S., the entire contents of which are incorporated herein by reference.

FIELD

The disclosures herein relate to a signal transmission system, a transmitting circuit, a receiving circuit, a signal transmitting method, and a signal receiving method.

BACKGROUND

Data transmission systems used in the art include a single-ended signal transmission system and a differential signal transmission system. The single-ended signal transmission system uses two signal lines, i.e., a single signal line for signal transmission and a single signal line for transmitting a ground potential, to connect between a transmitting end and a receiving end. In the case of transmitting a plurality of signals in parallel, a single ground line is shared by the plurality of signals. All the electric currents representing the plurality of signals flow into the ground line at the receiving end, thereby generating, with the impedance of the ground line, a crosstalk voltage responsive to the signal levels of these signals. This crosstalk voltage is added as noise voltages to signal components at the receiving end, which may result in the signals being incorrectly received.

The differential signal transmission system uses three signal lines, i.e., a single signal line for a non-inverted signal, a single signal line for an inverted signal, and a ground line, to connect between a transmitting end and a receiving end. In the case of transmitting a plurality of signals in parallel, a single ground line is shared by the plurality of signals. Although all the electric currents representing a plurality of signals flow into the ground line at the receiving end, the voltage generated with the impedance of the ground line becomes a constant voltage, which is independent of the signal levels of these signals. This is because the electric current of each signal has a constant current amount that is the sum of the non-inverted component and the inverted component. The addition of such a constant voltage into signal components at the receiving end does not affect the reception of correct signals. Since the receiving end detects a differential component as a signal, the addition of common noise does not affect the signal detection. However, the number of signal lines used in the differential signal transmission system is approximately double the number of signal lines used in the single-ended signal transmission system. The efficiency of signal transmission per signal line is thus low, resulting in the circuit configuration being uneconomical.

[Patent Document 1] Japanese Laid-open Patent Publication No. H1188182

[Patent Document 2] Japanese Laid-open Patent Publication No. 2004104797

SUMMARY

According to an aspect of the embodiment, a signal transmission system includes a transmitter configured to encode a transmission signal to generate 2N (N: integer larger than or equal to two) binary signals among which a number of 0s and a number of 1s are equal to each other, and to transmit the 2N binary signals, 2N signal lines configured to transmit the 2N binary signals, respectively, and a receiver configured to detect a bit pattern among a plurality of possible bit patterns of the 2N binary signals in response to a plurality of differential components between 2N received signals received through the 2N signal lines, and to decode the detected bit pattern.

According to an aspect of the embodiment, a transmitter includes a encoder configured to encode a transmission signal to generate 2N (N: integer larger than or equal to two) binary signals among which a number of 0s and a number of 1s are equal to each other, and a transmitting circuit configured to transmit, in response to the 2N binary signals, 2N transmission signals having voltages or currents thereof whose sum is constant.

According to an aspect of the embodiment, a receiver includes a receiving circuit configured to detect a bit pattern among a plurality of possible bit patterns of 2N (N: integer larger than or equal to two) binary signals among which a number of 0s and a number of 1s are equal to each other, in response to a plurality of differential components between 2N received signals, and a decoder configured to decode the detected bit pattern.

The object and advantages of the embodiment will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 5 is a drawing illustrating an encoding process performed by an encoder illustrated in FIG. 3;

FIG. 13 is a drawing illustrating a table that shows relationships between the differential components of four received signals and the possible bit patterns of four binary signals;

FIG. 14 is a drawing illustrating a table used to identify one of a plurality of possible bit patterns of four binary signals based on the results of detecting differential components between four received signals;

FIG. 19 is a drawing illustrating a table used to identify one of a plurality of possible bit patterns of four binary signals in response to differential components between four received signals; and FIG. 20 is a drawing illustrating the possible bit patterns of six binary signals, which are an example of 2N (N: integer that is two or larger) binary signals among which the number of 0s and the number of 1s are equal to each other.

DESCRIPTION OF EMBODIMENTS

In the following, embodiments of the invention will be described with reference to the accompanying drawings.

Figure 1:
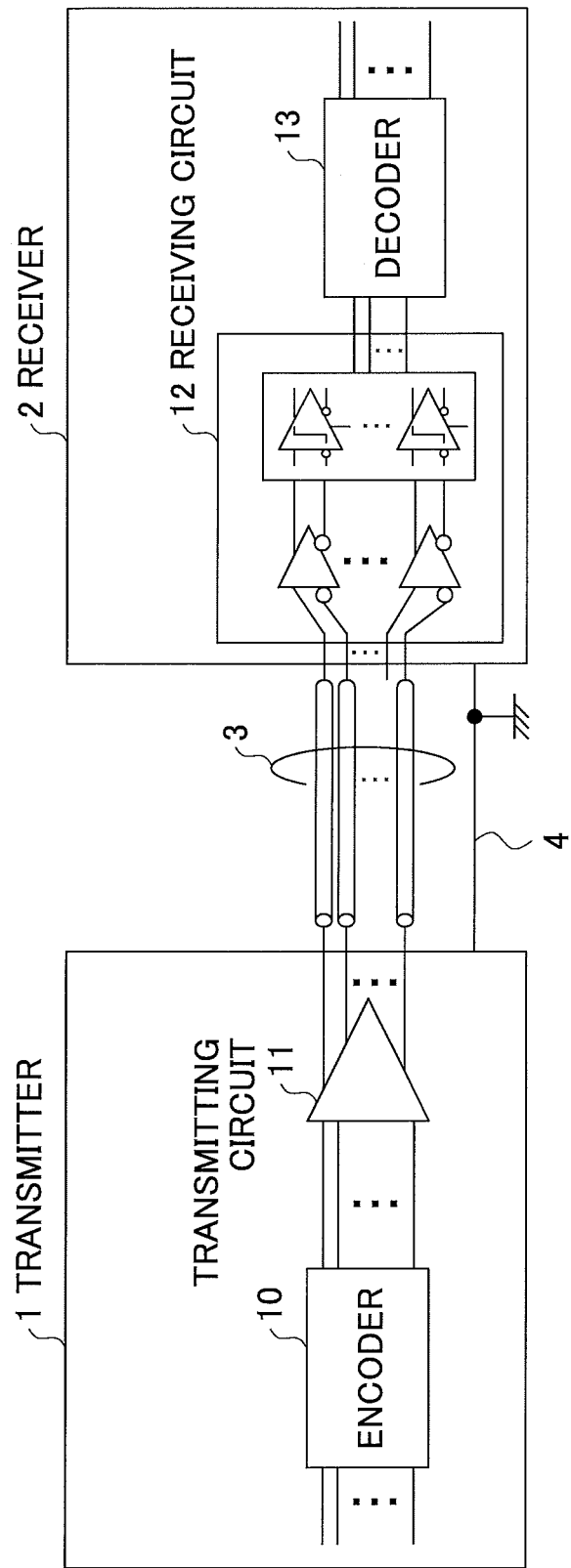
FIG. 1 is a drawing illustrating an example of the configuration of a signal transmission system.

FIG. 1 is a drawing illustrating an example of the configuration of a signal transmission system. The signal transmission system illustrated in FIG. 1 includes a transmitter 1, a receiver 2, and signal transmission lines 3. The transmitter 1 includes an encoder 10 and a transmitting circuit 11, and the receiver 2 includes a receiving circuit 12 and a decoder 13. In FIG. 1 and the subsequent drawings, boundaries between functional or circuit blocks illustrated as boxes basically indicate functional boundaries, and may not correspond to separation in terms of physical positions, separation in terms of electrical signals, separation in terms of control logic, etc. In a hardware configuration, each functional or circuit block may be a hardware module that is physically separated from other blocks to some extent, or may indicate a function in a hardware module in which this and other blocks are physically combined together.

The transmitter 1 encodes a transmission signal to generate 2N (N: an integer larger than or equal to two) binary signals among which the number of binary signals "0" and the number of binary signals "1" are equal to each other, followed by transmitting the 2N binary signals. The number of signal transmission lines 3 is equal to 2N, and these signal transmission lines 3 transmit the 2N binary signals, respectively. The receiver 2 detects one bit pattern among a plurality of possible bit patterns of the 2N binary signals in response to a plurality of differential components between the 2N received signals received through the 2N signal transmission lines 3, followed by decoding this detected bit pattern. Through this decoding process, the receiver 2 identifies the transmission signal that has been encoded by the transmitter 1. A ground line 4 is further connected between the transmitter 1 and the receiver 2. The encoder 10, the transmitting circuit 11, the receiving circuit 12, and the decoder 13 may be driven by a potential difference between a power supply potential and a ground potential provided by the ground line 4. Each of the signal transmission lines 3 may or may not be coupled to the ground line 4 through a termination resistor.

The transmitter 1 includes the encoder 10 that encodes a transmission signal to generate 2N binary signals among which the number of binary signals "0" and the number of binary signals "1" are equal to each other, and also includes the transmitting circuit 11 that transmits, in response to the 2N binary signals, 2N transmission signals that have voltages or currents whose sum is constant. The receiving circuit 12 of the receiver 2 detects one bit pattern among a plurality of possible bit patterns of the 2N binary signals among which the number of binary signals "0" and the number of binary signals "1" are equal to each other, in response to a plurality of differential components between the 2N received signals. The decoder 13 of the receiver 2 decodes the detected bit pattern.

Figure 2C:
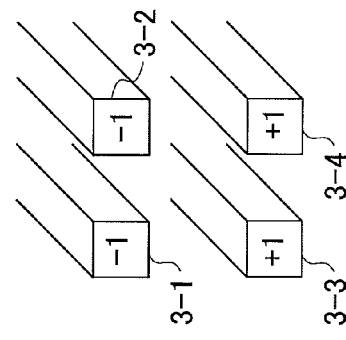
FIGS. 2A through 2F are drawings illustrating four binary signals among which the number of 0s and the number of 1s are equal to each other in the case of the number of signal transmission lines being four.
Figure 2F:
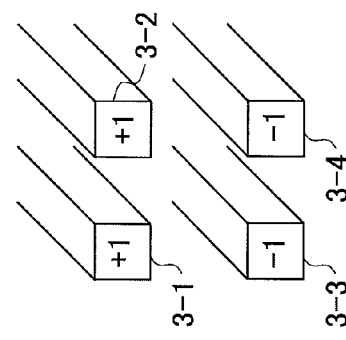
Figure 2B:
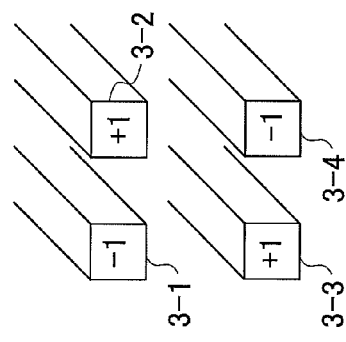
Figure 2E:
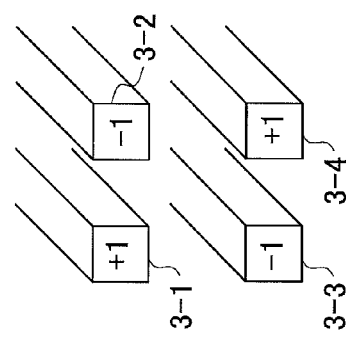
Figure 2A:
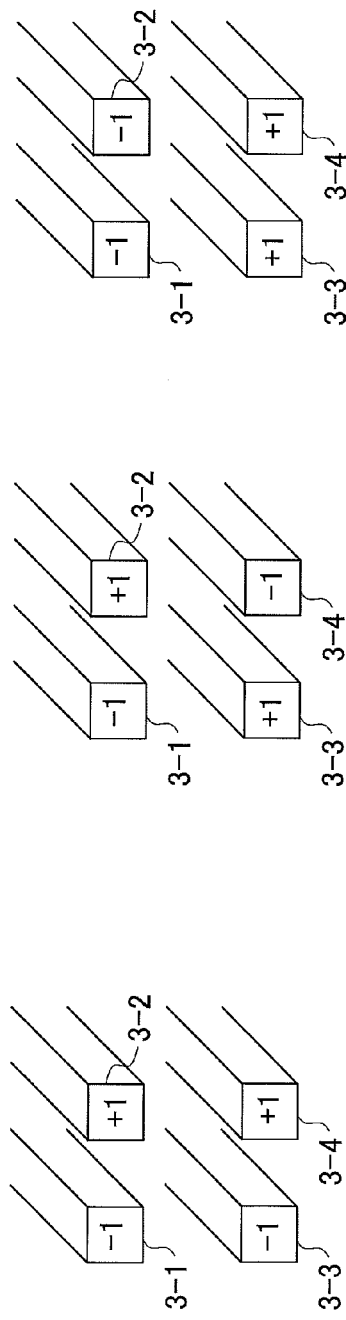

FIGS. 2A through 2F are drawings illustrating four binary signals among which the number of 0s and the number of 1s are equal to each other in the case of the number of signal transmission lines being four. In FIGS. 2A through 2F, the signal transmission lines 3 of FIG. 1 are illustrated as four signal lines 3-1 through 3-4. In FIG. 2A, the signal lines 3-1, 3-2, 3-3, and 3-4 have signal values assigned thereto that are −1, +1, −1, and +1, respectively. In this example, the signal value of a signal voltage that is higher than a predetermined threshold voltage above a common voltage is denoted as +1, and the signal value of a signal voltage that is lower than a predetermined threshold voltage below the common voltage is denoted as −1. As for the binary logic values of signals, the signal value "+1" may correspond to the logic value "1", and the signal value "−1" may correspond to the logic value "0".

Figure 2D:
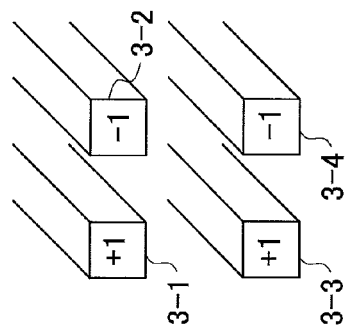

In FIG. 2B, the signal lines 3-1, 3-2, 3-3, and 3-4 are −1, +1, +1, and −1, respectively. In FIG. 2C, the signal lines 3-1, 3-2, 3-3, and 3-4 are −1, −1, +1, and +1, respectively. In FIG. 2D, the signal lines 3-1, 3-2, 3-3, and 3-4 are +1, −1, +1, and −1, respectively. In FIG. 2E, the signal lines 3-1, 3-2, 3-3, and 3-4 are +1, −1, −1, and +1, respectively. In FIG. 2F, the signal lines 3-1, 3-2, 3-3, and 3-4 are +1, +1, −1, and −1, respectively.

In this manner, in each of the six cases illustrated in FIGS. 2A through 2F, the number of 0s and the number of 1s among the binary signals assigned to the four respective signal transmission lines 3-1 through 3-4 are both equal to two, and are equal to each other. With respect to four transmission signals transmitted in response to the four binary signals, the transmitting circuit is configured to make constant the sum of signal voltages or signal currents of these four transmission signals.

With such an arrangement, the amount of currents flowing into the ground potential is kept constant all the time. Namely, the voltage generated by the impedance of the ground line becomes a constant voltage independent of the signal levels of signals. The addition of such a constant voltage into signal components at the receiving end does not affect the reception of correct signals. As was previously described, the receiver 2 detects one bit pattern among a plurality of possible bit patterns of the 2N binary signals in response to a plurality of differential components between the 2N received signals received through the 2N signal transmission lines 3. Accordingly, the addition of common noise does not affect the signal detection that is performed based on differential components. Further, the number of signal lines is 2 per 1 bit of information in the case of the traditional differential signal transmission system, whereas the number of signal lines is 4 per 2.5 bits of information in the case of the signal transmission system illustrated in FIGS. 2A through 2F, which means the number of signal lines is 1.6 per 1 bit of information. High signal transmission efficiency is thus attained.

Figure 3:
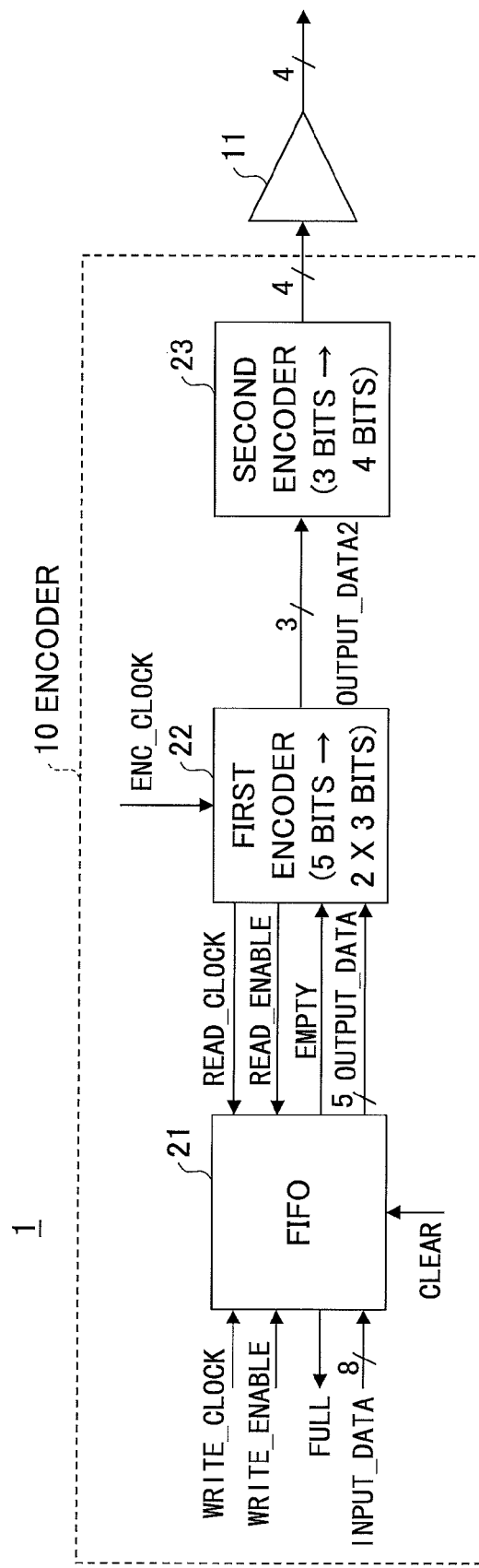
FIG. 3 is a drawing illustrating an example of the detailed configuration of a transmitter.

FIG. 3 is a drawing illustrating an example of the detailed configuration of the transmitter. The transmitter 1 illustrated in FIG. 3 includes the encoder 10 and the transmitting circuit 11. The encoder 10 includes a FIFO 21, a first encoder 22, and a second encoder 23. The FIFO 21 receives input data INPUT_DATA having a width of 8 bits in synchronization with a write clock WRITE_CLOCK, and loads the input data therein in response to a write enable WRITE_ENABLE being in an asserted state (i.e., HIGH). The FIFO 21 is 40 bits in length, and asserts a full-state notification signal FULL when an attempt is made to write data in excess of 40 bits (i.e., 5 input data of 8-bit width). The first encoder 22 supplies to the FIFO a read clock READ_CLOCK that has the same cycle as the write clock WRITE_CLOCK, and sets a read enable READ_ENABLE to an asserted state (i.e., HIGH). In response, output data (read data) OUTPUT_DATA having a width of 5 bits is read from the head of data stored in the FIFO 21 in synchronization with each pulse of the read clock READ_CLOCK. Upon no data being left in the FIFO 21, the FIFO 21 asserts an empty-state notification signal EMPTY to the first encoder 22.

Figure 4:
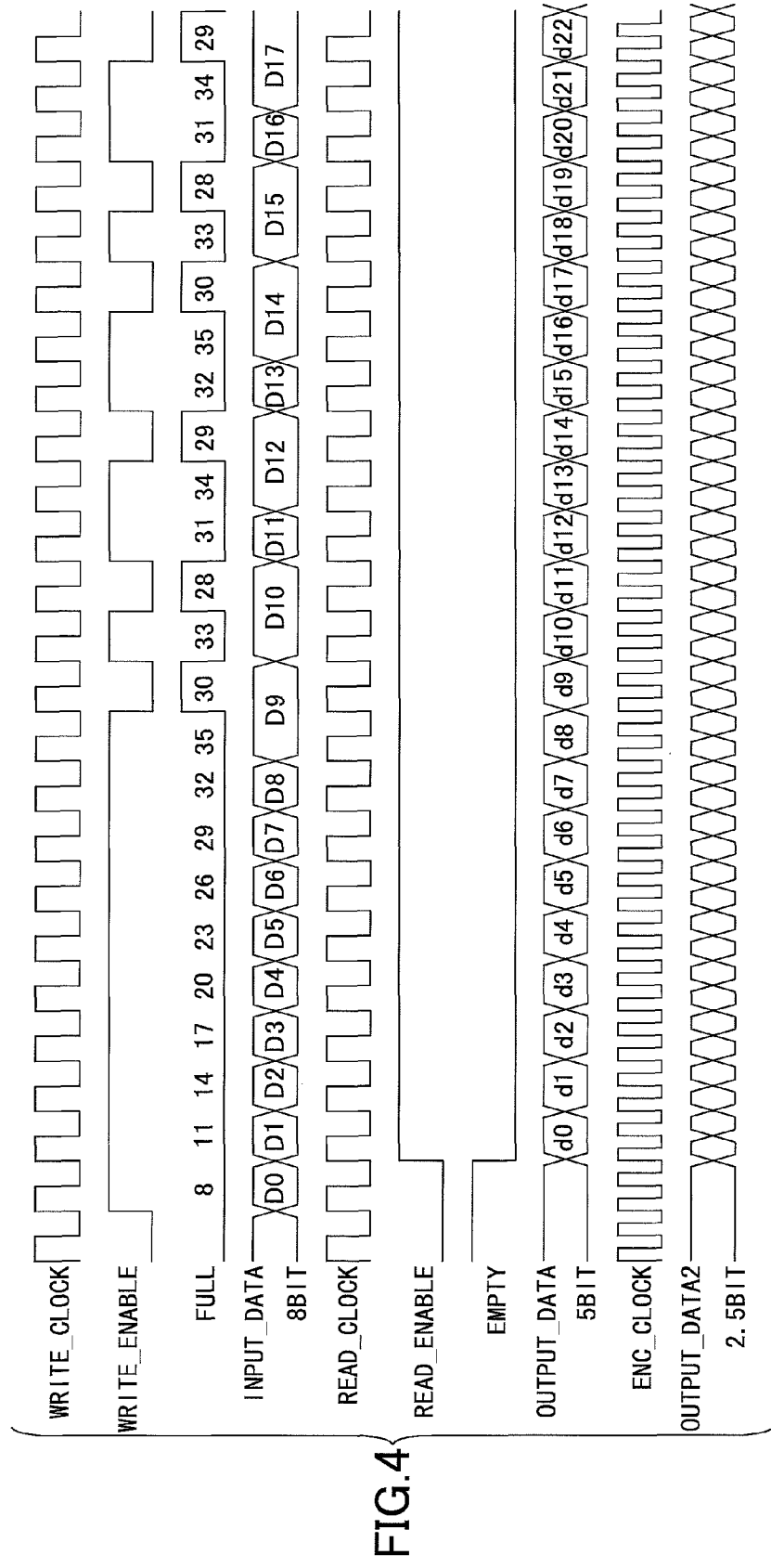
FIG. 4 is a timing chart illustrating an example of an operation of an encoder illustrated in FIG. 3.

FIG. 4 is a timing chart illustrating an example of an operation of the encoder 10 illustrated in FIG. 3. In response to the write clock WRITE_CLOCK, data are written to the FIFO 21 in units of 8 bits during the HIGH state of the write enable WRITE_ENABLE. In response to the read clock READ_CLOCK, data are read from the FIFO 21 in units of 5 bits during the HIGH state of the read enable READ_ENABLE. Accordingly, the number of data bits stored in the FIFO 21 increases in such a sequence as 8, 11, 14, ... indicated in the row where FULL is illustrated. When the number of stored data bits is 35, the next one of the input data INPUT_DATA that is denoted as D9 cannot be written to the FIFO 21, so that the full-state notification signal FULL is asserted. Reading 5-bit output data OUTPUT_DATA denoted as d8 from the FIFO 21 results in the number of stored data bits being 30 bits in the next following cycle, so that D9 of the input data INPUT_DATA is written to the FIFO 21. In this manner, 8-bit input data supplied to the FIFO 21 is converted into 5-bit output data output from the FIFO 21.

The first encoder 22 performs an encoding process in synchronization with an encoding clock ENC_CLOCK to encode one item of the output data OUTPUT_DATA having a width of 5 bits read from the FIFO 21 into two items of output data OUTPUT_DATA2 each having a width of 3 bits. The amount of information of one item of the output data OUTPUT_DATA having a width of 5 bits is 5 bits, so that the two items of the output data OUTPUT_DATA2 each having a width of 3 bits each have 2.5 bits of information.

FIG. 5 is a drawing illustrating the encoding process performed by the encoder 10 illustrated in FIG. 3. In the table illustrated in FIG. 5, the output data OUTPUT_DATA (5-bit width) of the FIFO 21 are illustrated in the second column from the left. The number of output data OUTPUT_DATA (5-bit width) is 32, and each has 5 bits of information. Senary integers each having two or fewer digits illustrated in the third column from the left are assigned to the 32 output data OUTPUT_DATA (5-bit width), respectively. From 00 to 55, there are 36 senary integers each having two or fewer digits, 32 of which are listed in the table illustrated in FIG. 5.

The output data OUTPUT_DATA2 (3-bit width) illustrated in the fourth and fifth columns from the left are the two data items each having a width of 3 bits that are generated by the first encoder 22 illustrated in FIG. 3. Among these two data items each having a width of 3 bits, the data of 3-bit width on the left correspond to the upper-order digits of the senary integers as expressed in binary numbers. Among these two data items each having a width of 3 bits, the data of 3-bit width on the right correspond to the lower-order digits of the senary integers as expressed in binary numbers. The number of different patterns in the data of 3-bit width is 6, which corresponds to 2.5 bits of information.

The encoding results (4-bit width) illustrated in the two columns on the rightmost side are data having a width of 4 bits among which the number of 0s and the number of 1s are equal to each other, and which are assigned to the data of 3-bit width described above. In the case of data having a width of 4 bits among which the number of 0s and the number of 1s are equal to each other, the total number of patterns different from each other is 6 as described in connection with FIGS. 2A through 2F. The data having a width of 4 bits among which the number of 0s and the number of 1s are equal to each other can thus be assigned in one-to-one correspondence to the above-noted data of 3-bit width for which 6 different patterns exist.

In this manner, one data item having a width of 5 bits is encoded into two data items each having a width of 4 bits among which the number of 0s and the number of 1s are equal to each other. One data item having a width of 4 bits among which the number of 0s and the number of 1s are equal to each other carries 2.5 bits of information.

Figure 6:
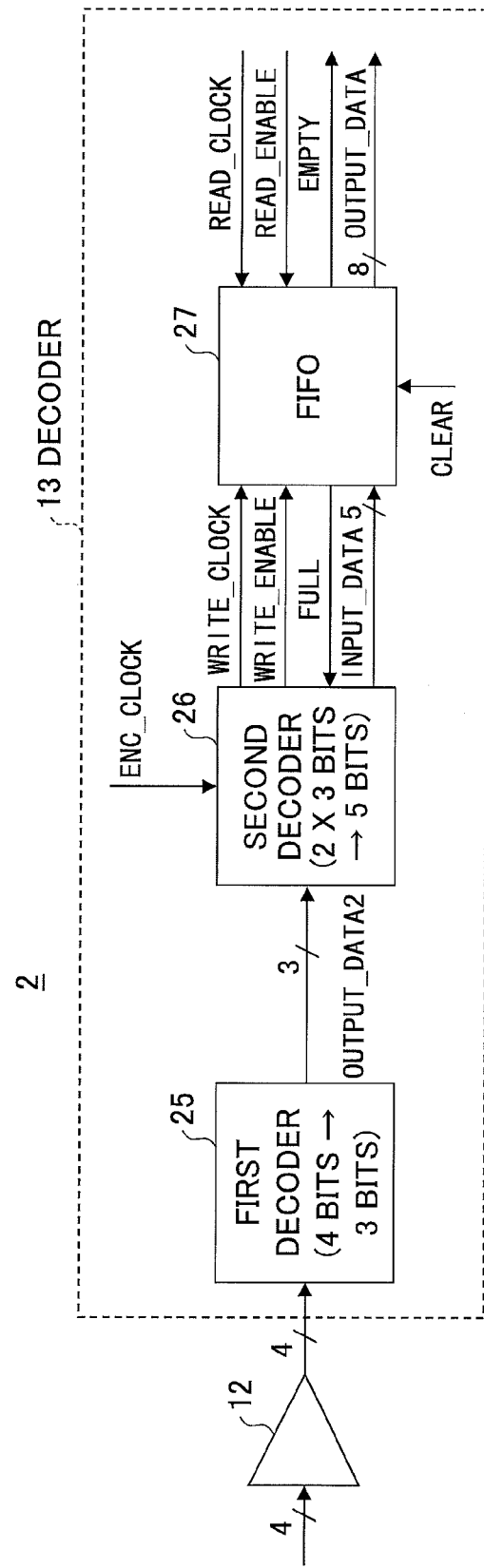
FIG. 6 is a drawing illustrating an example of the detailed configuration of a receiver.

FIG. 6 is a drawing illustrating an example of the detailed configuration of the receiver. The receiver 2 illustrated in FIG. 6 includes the receiving circuit 12 and the decoder 13. The decoder 13 includes a first decoder 25, a second decoder 26, and a FIFO 27. The receiving circuit 12 detects one bit pattern among a plurality of possible bit patterns of the 2N binary signals among which the number of binary signals "0" and the number of binary signals "1" are equal to each other, in response to a plurality of differential components between the 2N received signals. The receiving circuit 12 outputs the detected bit pattern having a width of 4 bits. The first decoder 25 receives the data having a width of 4 bits among which the number of 0s and the number of 1s are equal to each other, and converts the received data into data having a width of 3 bits. This data conversion is an inverse of the conversion of the encoding process performed by the second encoder 23 of the transmitter 1. The second decoder 26 converts two data items each having a width of 3 bits supplied from the first decoder 25 into data having a width of 5 bits. This conversion is an inverse of the conversion of the encoding process performed by the first encoder 22 of the transmitter 1. The FIFO 27 operates in the same manner as the FIFO 21 illustrated in FIG. 3, except that the write data width is 5 bits and that the read data width is 8 bits. The FIFO 27 converts 5-bit-wide data into 8-bit-wide data. This 8-bit-wide data is provided as decoded received data.

As will be described later, the receiving circuit 12 does not necessarily have to produce a bit pattern having a width of 4 bits (i.e., width of 2N bits in general). For example, it suffices for the receiving circuit 12 to only identify one bit pattern among a plurality of possible bit patterns of the 2N binary signals among which the number of binary signals "0" and the number of binary signals "1" are equal to each other, in response to a plurality of differential components between the 2N received signals. For example, the receiving circuit 12 may directly output the 3-bit-wide data OUTPUT_DATA2 (i.e., the 3-bit-wide data output from the first decoder 25) corresponding to the identified bit pattern.

Figure 7:
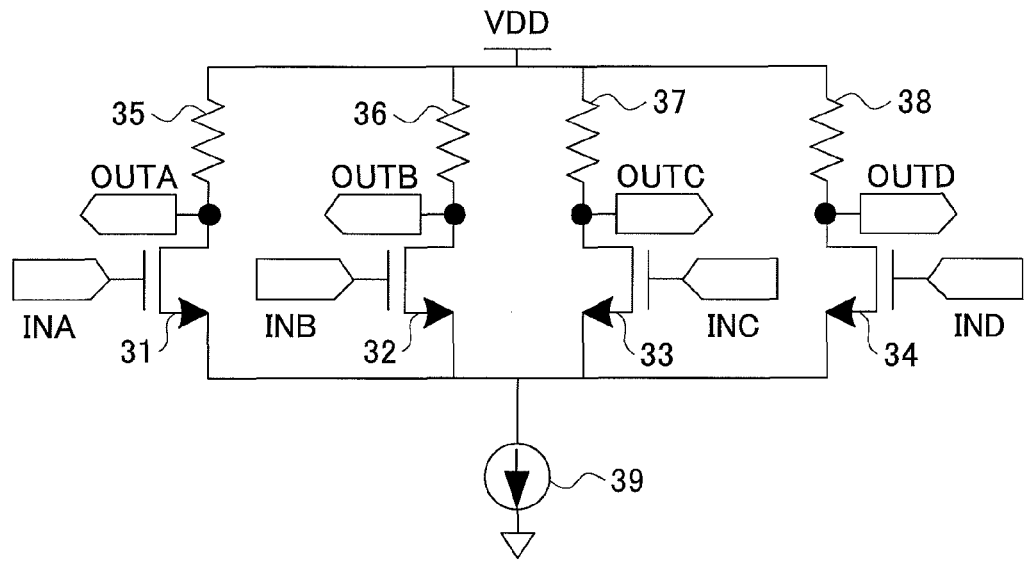
FIG. 7 is a drawing illustrating an example of the configuration of a transmitting circuit.

FIG. 7 is a drawing illustrating an example of the configuration of the transmitter. FIG. 7 illustrates an example of the transmitting circuit 11 in the case of the number of binary signals being 4. The transmitting circuit illustrated in FIG. 7 includes NMOS transistors 31 through 34, resistors 35 through 38, and a constant current source 39. The NMOS transistors 31 through 34 all have the same characteristics. The resistors 35 through 38 all have the same resistance value.

The constant current source 39 has a first end thereof coupled to a first power supply voltage (i.e., ground voltage). The four NMOS transistors 31 through 34 have first ends (i.e., source nodes) of the channels thereof coupled to a second end of the constant current source 39, and receive four binary signals at the control node (i.e., gate node) thereof, respectively. The four resistors 35 through 38 have first ends thereof coupled to the second ends (i.e., drain nodes) of the four NMOS transistors 31 through 34, respectively, and have second ends thereof coupled to a second power supply voltage (i.e., power supply voltage VDD). The control nodes (i.e., gate nodes) of the four NMOS transistors 31 through 34 serve as input terminals INA, INB, INC, and IND for the four binary signals, respectively. The second ends (i.e., drain nodes) of the four NMOS transistors 31 through 34 serve as output terminals OUTA, OUTB, OUTC, and OUTD for four transmission signals, respectively. The circuit configuration illustrated in FIG. 7 for the case of the number of binary signals being 4 is only an example. In the case of the number of binary signals being 2N, provision is made such that 2N NMOS transistors and 2N resistors are provided.

As was previously described, the number of 0s and the number of 1s are equal to each other (i.e., 2) among the four binary signals. The sum of quantity of currents flowing through the NMOS transistors 31 through 34 is constant because of the provision of the constant current source 39. This transmitting circuit enables the transmission of four transmission signals having voltages or currents the sum of which is constant. Namely, transmission signals are transmitted in such conditions that the sum of the output voltage of the output terminal OUTA, the output voltage of the output terminal OUTB, the output voltage of the output terminal OUTC, and the output voltage of the output terminal OUTD is kept constant over time. Alternatively, transmission signals are transmitted in such conditions that the sum of the output current of the output terminal OUTA, the output current of the output terminal OUTB, the output current of the output terminal OUTC, and the output current of the output terminal OUTD is kept constant over time. The fact that a plurality of transmission signals are kept in a balanced state as a whole makes it possible to keep constant the amount of currents flowing into the ground potential, for example. This enables the reliable detection of received signals at the receiving end.

Figure 8:
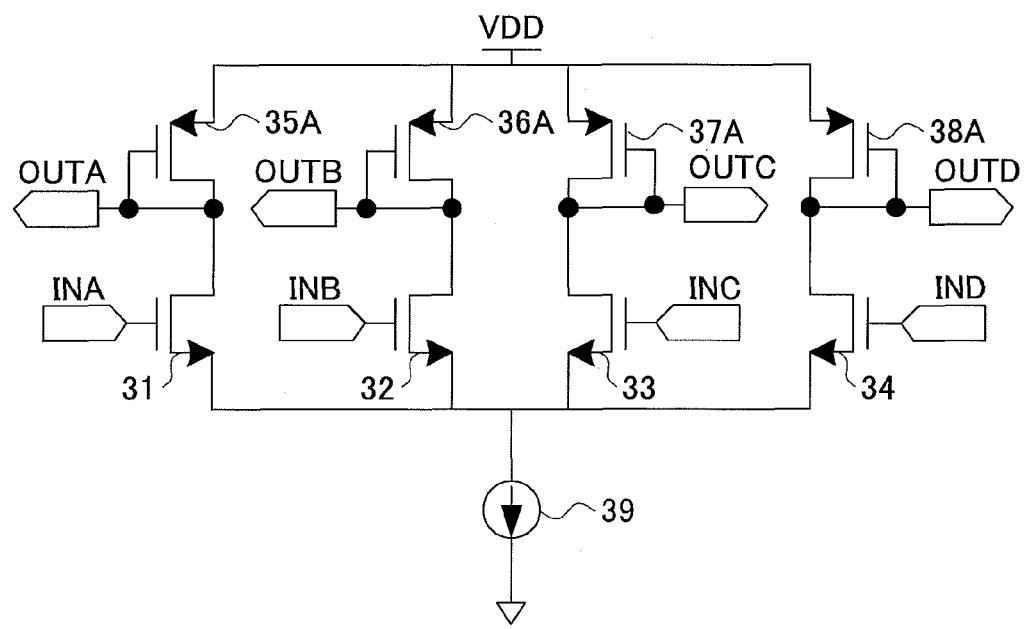
FIG. 8 is a drawing illustrating another example of the configuration of the transmitting circuit.
Figure 9:
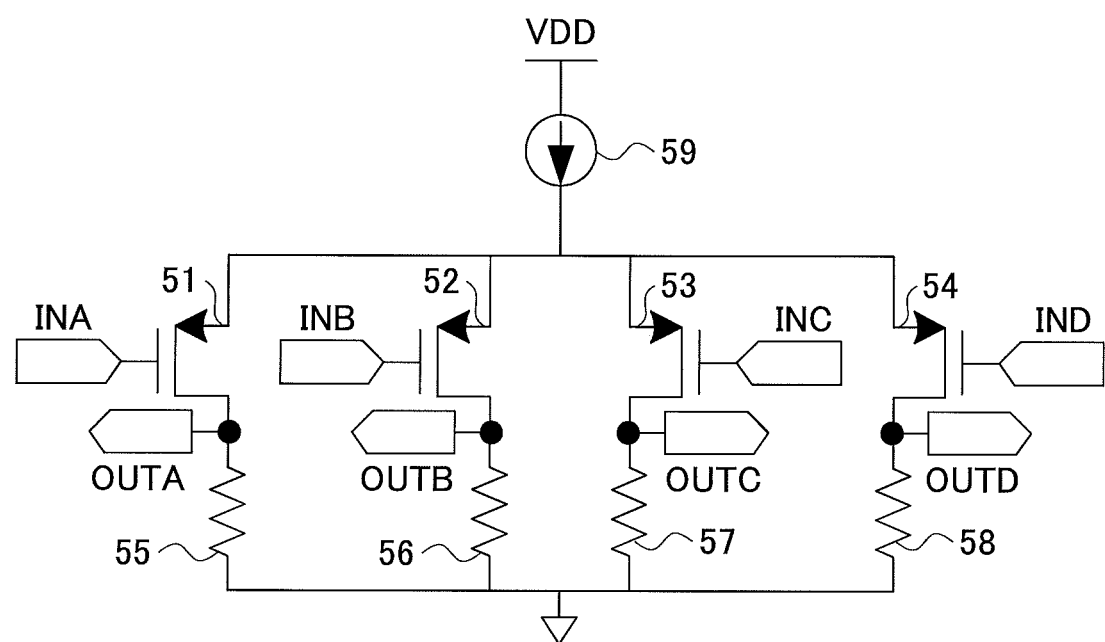
FIG. 9 is a drawing illustrating yet another example of the configuration of the transmitting circuit.

FIG. 8 is a drawing illustrating another example of the configuration of the transmitting circuit. FIG. 9 illustrates an example of the transmitting circuit 11 in the case of the number of binary signals being 4. In FIG. 8, the same or corresponding elements as those of FIG. 7 are referred to by the same or corresponding numerals, and a description thereof will be omitted as appropriate.

The transmitting circuit illustrated in FIG. 8 differs from the transmitting circuit illustrated in FIG. 7 in that the resistors 35 through 38 are replaced with PMOS transistors 35A through 38A, respectively. The PMOS transistors 35A through 38A all have the same characteristics. The use of the PMOS transistors 35A through 38A as load elements in place of the resistor elements enables the generation of a large voltage change in response to a small current change.

FIG. 9 is a drawing illustrating yet another example of the configuration of the transmitting circuit. FIG. 9 illustrates an example of the transmitting circuit 11 in the case of the number of binary signals being 4. The transmitting circuit illustrated in FIG. 9 includes PMOS transistors 51 through 54, resistors 55 through 58, and a constant current source 59. The PMOS transistors 51 through 54 all have the same characteristics. The resistors 55 through 58 all have the same resistance value.

The constant current source 59 has a first end thereof coupled to a first power supply voltage (i.e., power supply voltage VDD). The four PMOS transistors 51 through 54 have first ends (i.e., source nodes) of the channels thereof coupled to a second end of the constant current source 39, and receive four binary signals at the control node (i.e., gate node) thereof, respectively. The four resistors 55 through 58 have first ends thereof coupled to the second ends (i.e., drain nodes) of the four PMOS transistors 51 through 54, respectively, and have second ends thereof coupled to a second power supply voltage (i.e., ground voltage). The control nodes (i.e., gate nodes) of the four PMOS transistors 51 through 54 serve as input terminals INA, INB, INC, and IND for the four binary signals, respectively. The second ends (i.e., drain nodes) of the four PMOS transistors 51 through 54 serve as output terminals OUTA, OUTB, OUTC, and OUTD for four transmission signals, respectively.

Like the transmitting circuit of FIG. 7, the transmitting circuit of FIG. 9 enables the transmission of four transmission signals having voltages or currents whose sum is constant. The fact that a plurality of transmission signals are kept in a balanced state as a whole makes it possible to keep constant the amount of currents flowing into the ground potential, for example. This enables the reliable detection of received signals at the receiving end.

Figure 10:
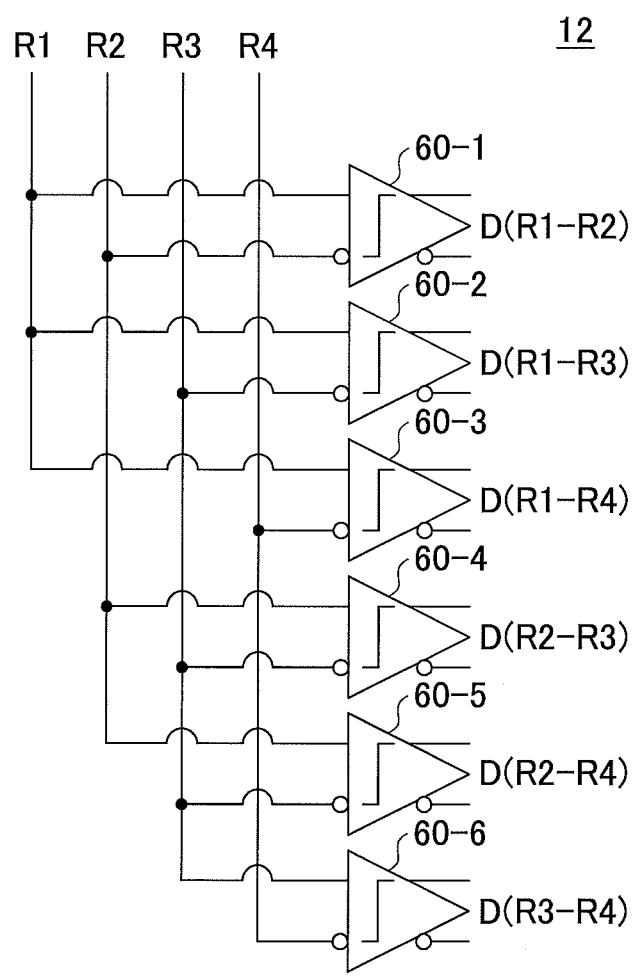
FIG. 10 is a drawing illustrating an example of the configuration of part of the receiving circuit.

FIG. 10 is a drawing illustrating an example of the configuration of part of the receiving circuit. FIG. 10 illustrates an example in the case of the number of binary signals being 4. Similarly to the transmitting circuit previously described, the configuration of the receiving circuit 12 is not limited to the circuit configuration for the case of the number of binary signals being 4, and may be designed to receive 2N (N: integer larger than or equal to two) binary signals.

The part of the receiving circuit 12 illustrated in FIG. 10 includes differential comparators 60-1 through 60-6. Each of the differential comparators 60-1 through 60-6 receives two of the four received signals R1 through R4 received through the four signal transmission lines 3, and detects a differential component between these two signals. The four binary signals previously described propagate through the signal transmission lines 3, and are received at the receiving end as the four received signals R1 through R4. The differential comparator 60-1, for example, detects a differential component between the received signal R1 and the received signal R2 to output a detection value D(R1−R2). The differential comparator 60-2, for example, detects a differential component between the received signal R1 and the received signal R3 to output a detection value D(R1−R3).

Figure 11:
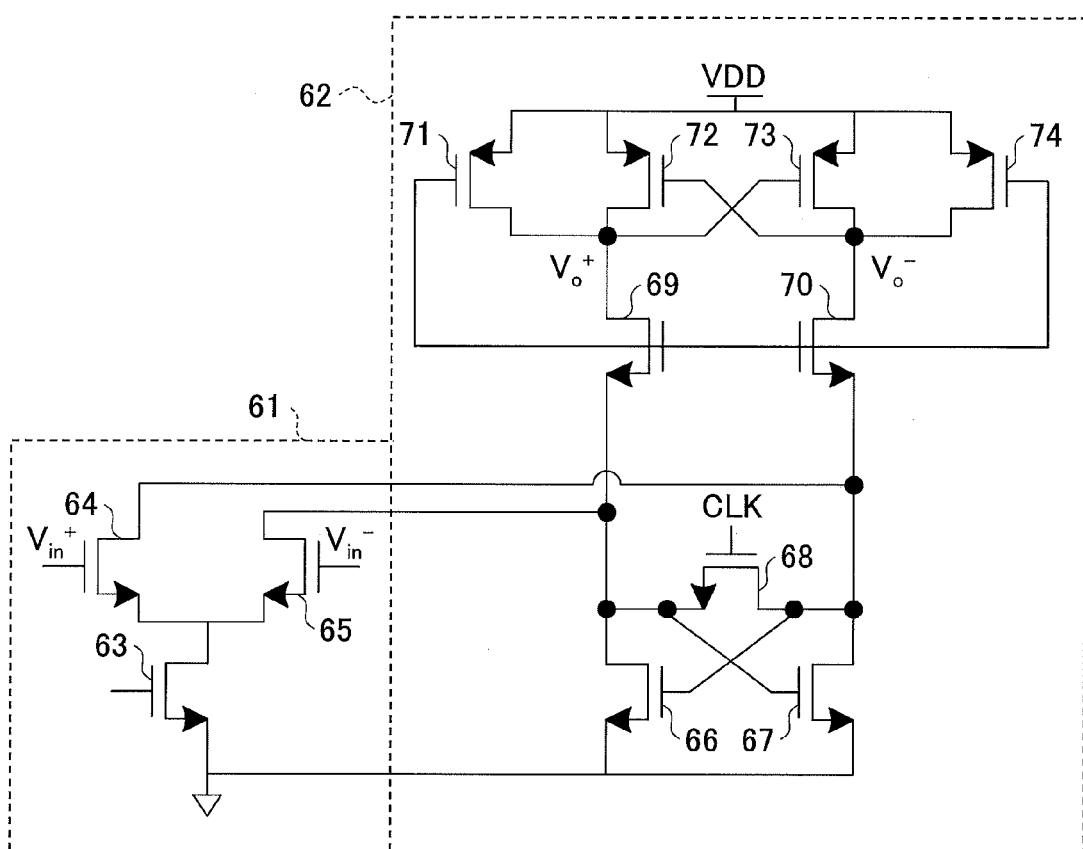
FIG. 11 is a drawing illustrating an example of the configuration of a differential comparator.

FIG. 11 is a drawing illustrating an example of the configuration of a differential comparator. The differential comparator illustrated in FIG. 11 includes a differential amplifier 61 and a latch 62. The differential amplifier 61 includes NMOS transistors 63 through 65. The latch 62 includes NMOS transistors 66 through 70 and PMOS transistors 71 through 74. The NMOS transistors 64 and 65 of the differential amplifier 61 have the gates thereof receiving two input signal voltages $V_{in}+$ and $V_{in}-$, respectively. These two input signal voltages $V_{in}+$ and $V_{in}-$ are the voltage of the received signal R1 and the voltage of the received signal R2 in the case of the differential comparator 60-1. The NMOS transistors 69 and 70 of the latch 62 have the drain nodes thereof whose voltages are output voltages $V_o+$ and $V_o-$, respectively. A difference between the voltage of the received signal R1 and the voltage of the received signal R2 is amplified to become a voltage corresponding to a decision value (i.e., detection value) being either "0" or "1", which is output as the output signal voltages $V_o+$ and $V_o-$.

Figure 12:
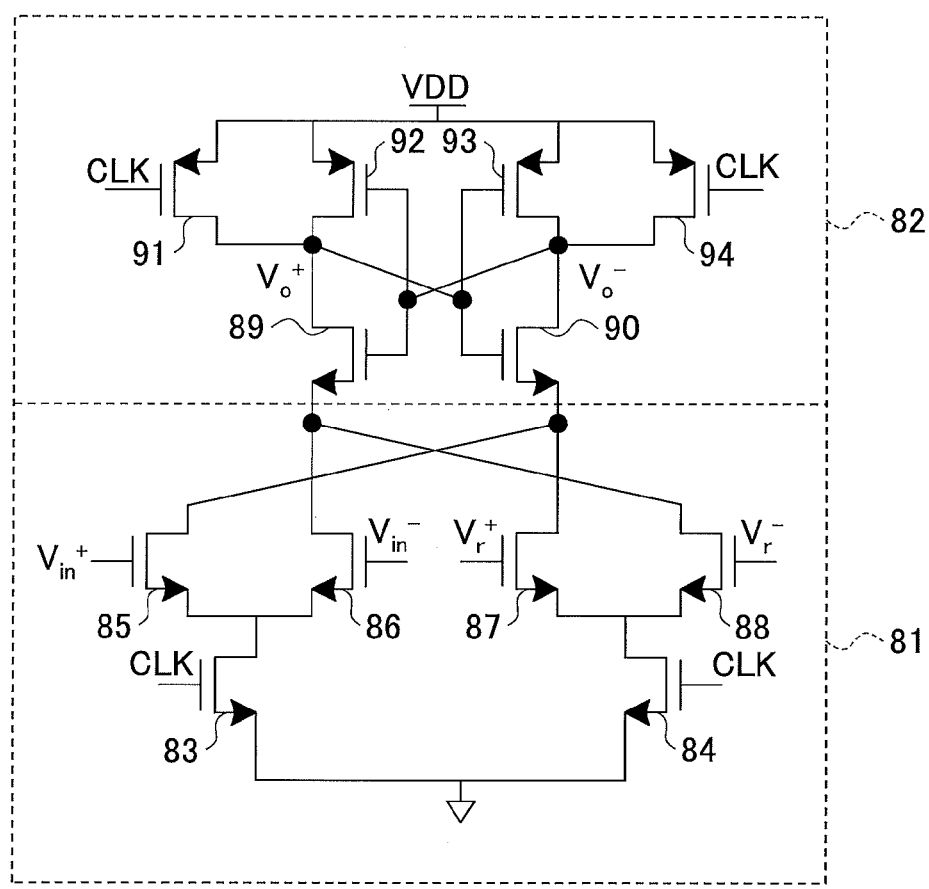
FIG. 12 is a drawing illustrating another example of the configuration of the differential comparator.

FIG. 12 is a drawing illustrating another example of the configuration of a differential comparator. The differential comparator illustrated in FIG. 12 includes a differential amplifier 81 and a latch 82. The differential amplifier 81 includes NMOS transistors 83 through 88. The latch 82 includes NMOS transistors 89 and 90 and PMOS transistors 91 through 94. The NMOS transistors 85 and 86 of the differential amplifier 81 have the gates thereof receiving two input signal voltages $V_{in}+$ and $V_{in}-$, respectively. These two input signal voltages $V_{in}+$ and $V_{in}-$ are the voltage of the received signal R1 and the voltage of the received signal R2 in the case of the differential comparator 60-1. The NMOS transistors 87 and 88 of the differential amplifier 81 have the gates thereof receiving two reference signal voltages $V_r+$ and $V_r-$, respectively. The NMOS transistors 89 and 90 of the latch 82 have the drain nodes thereof whose voltages are output voltages $V_o+$ and $V_o-$, respectively. A difference between the voltage of the received signal R1 and the voltage of the received signal R2 is amplified, and, as a result of comparison with the reference voltages, becomes a voltage corresponding to a decision value (i.e., detection value) being either "0" or "1", which is output as the output signal voltages $V_o+$ and $V_o-$.

FIG. 13 is a drawing illustrating a table that shows relationships between the differential components of four received signals and the possible bit patterns of four binary signals. In the table illustrated in FIG. 13, the second through seventh columns provide the results of detecting differential components between two signals among the four received signals. The column indicated as "D(R1–R2)", for example, provides the values of the differential component detected by the differential comparator 60-1 illustrated in FIG. 10. In the table of FIG. 13, the value "1" indicates a detection value of "1", which corresponds to the case in which the output signal voltages $V_o+$ and $V_o-$ of a differential comparator are HIGH and LOW, respectively. The value "–1" indicates a detection value of "–1", which corresponds to the case in which the output signal voltages $V_o+$ and $V_o-$ of a differential comparator are LOW and HIGH, respectively. Further, the value "x" indicates the case in which both of the received signals for which a differential component is detected are the binary signal "0", so that a detection value is not reliable. Moreover, the value "y" indicates the case in which both of the received signals for which a differential component is detected are the binary signal "1", so that a detection value is not reliable.

In the table illustrated in FIG. 13, the first column provides a plurality of possible bit patterns of the four binary signals among which the number of 0s and the number of 1s are equal to each other. It may be noted that the most significant bit to the least significant bit of these bit patterns correspond to the received signals R1 to R4, respectively. In the case of the bit pattern "1010" shown in the first row, the detection value D(R1–R2) of a differential component of the received signals R1 and R2 is supposed to be "1-0", so that the detection value of the differential comparator should be "1". Further, the detection value D(R1–R3) of a differential component of the received signals R1 and R3 is supposed to be "1-1", so that the detection value of the differential comparator cannot be reliably determined to be either "0" or "1". The detection value thus becomes an unreliable value (i.e., "y").

As can be understood by analyzing the table of FIG. 13, only "1010" is viable as a bit pattern capable of creating the condition that D(R1–R2) is "1", and D(R1–R4) is "1", with D(R2–R3) being "–1" and D(R3–R4) being "1". Consequently, the fact that this condition is satisfied allows the received signals to be identified as "1010". Similarly, if the condition that D(R1–R2) is "1", and D(R1–R3) is "1", with D(R2–R 4) being "–1" and D(R3–R4) being "–1" is satisfied, the received signal can be identified as "1001". Similarly, one of the bit patterns listed in the table of FIG. 13 can be identified in accordance with the detection values of differential components between the four received signals.

Figure 14:
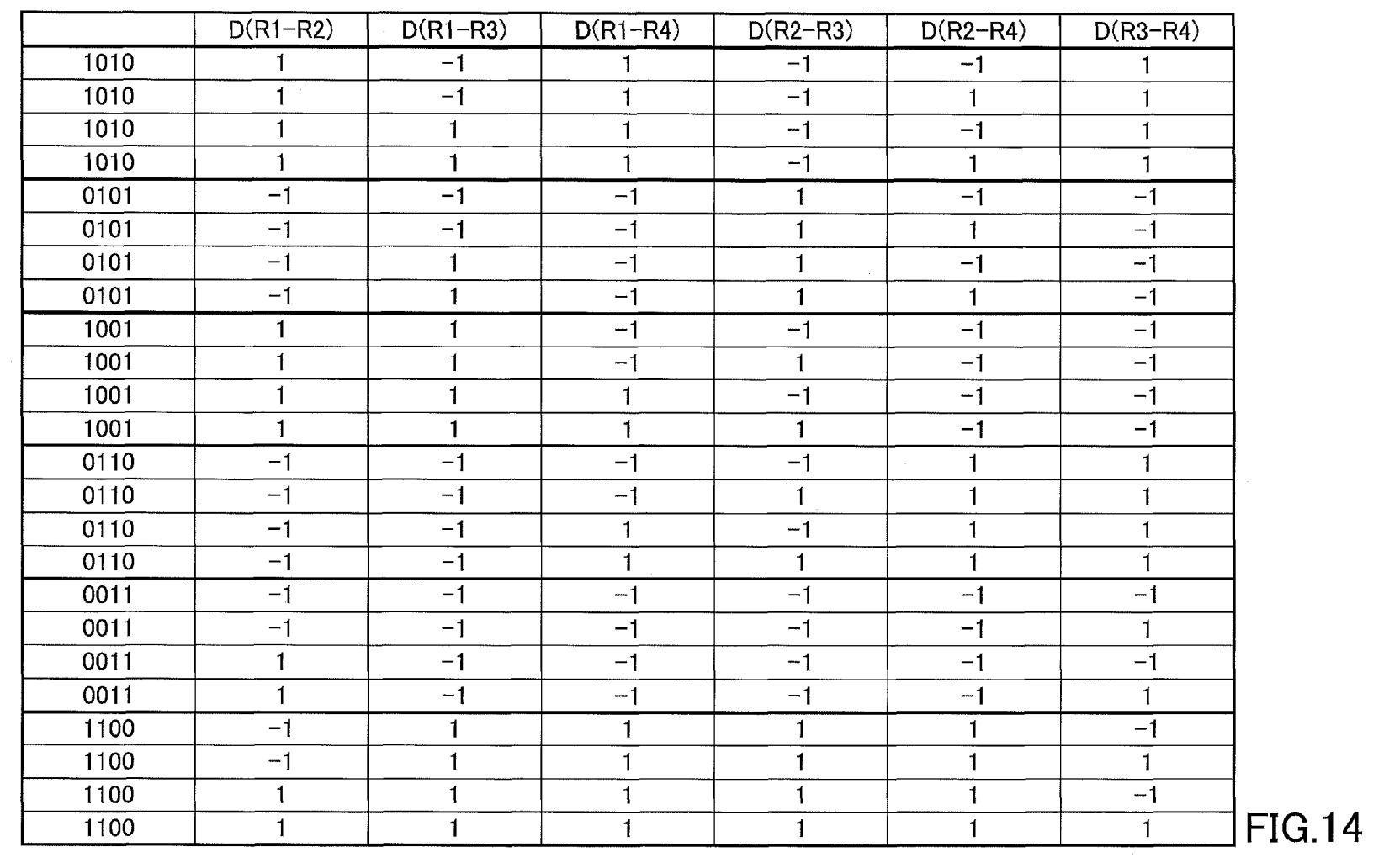

FIG. 14 is a drawing illustrating a table used to identify one of a plurality of possible bit patterns of four binary signals based on the results of detecting differential components between four received signals. In the table illustrated in FIG. 14, the second through seventh columns provide the results of detecting differential components between two signals among the four received signals. The table of FIG. 14 illustrates all the patterns in which the differential components specified as "x" or "y" in the table of FIG. 13 are actually identified as either "1" or "–1". Upon all the detection values D(R1–R2), D(R1–R3), D(R1–R4), D(R2–R3), D(R2–R4), and D(R3–R4) being obtained, one of the bit patterns can be selected based on the table illustrated in FIG. 14. For example, the case in which D(R1–R2), D(R1–R3), D(R1–R4), D(R2–R3), D(R2–R4), and D(R3–R4) are "1", "1", "1", "–1", "–1", and "1", respectively, results in "1010" being selected.

In this manner, one bit pattern among a plurality of possible bit patterns of the 2N binary signals among which the number of binary signals "0" and the number of binary signals "1" are equal to each other is detected in response to a plurality of differential components between 2N received signals. In this example, the differential components are D(R1–R2), D(R1–R3), D(R1–R4), D(R2–R3), D(R2–R4), and D(R3–R4). These differential components correspond to all the combinations obtained by selecting two signals from the 2N (i.e., 4 in this case) received signals. Further, each of these differential components are the result of detecting a differential component between the two corresponding signals among the 2N (i.e., 4 in this case) received signals. For example, D(R1–R2) is the resulting value ("0" or "1") obtained by detecting a differential component between the two received signals R1 and R2 by use of a differential comparator.

Figure 15:
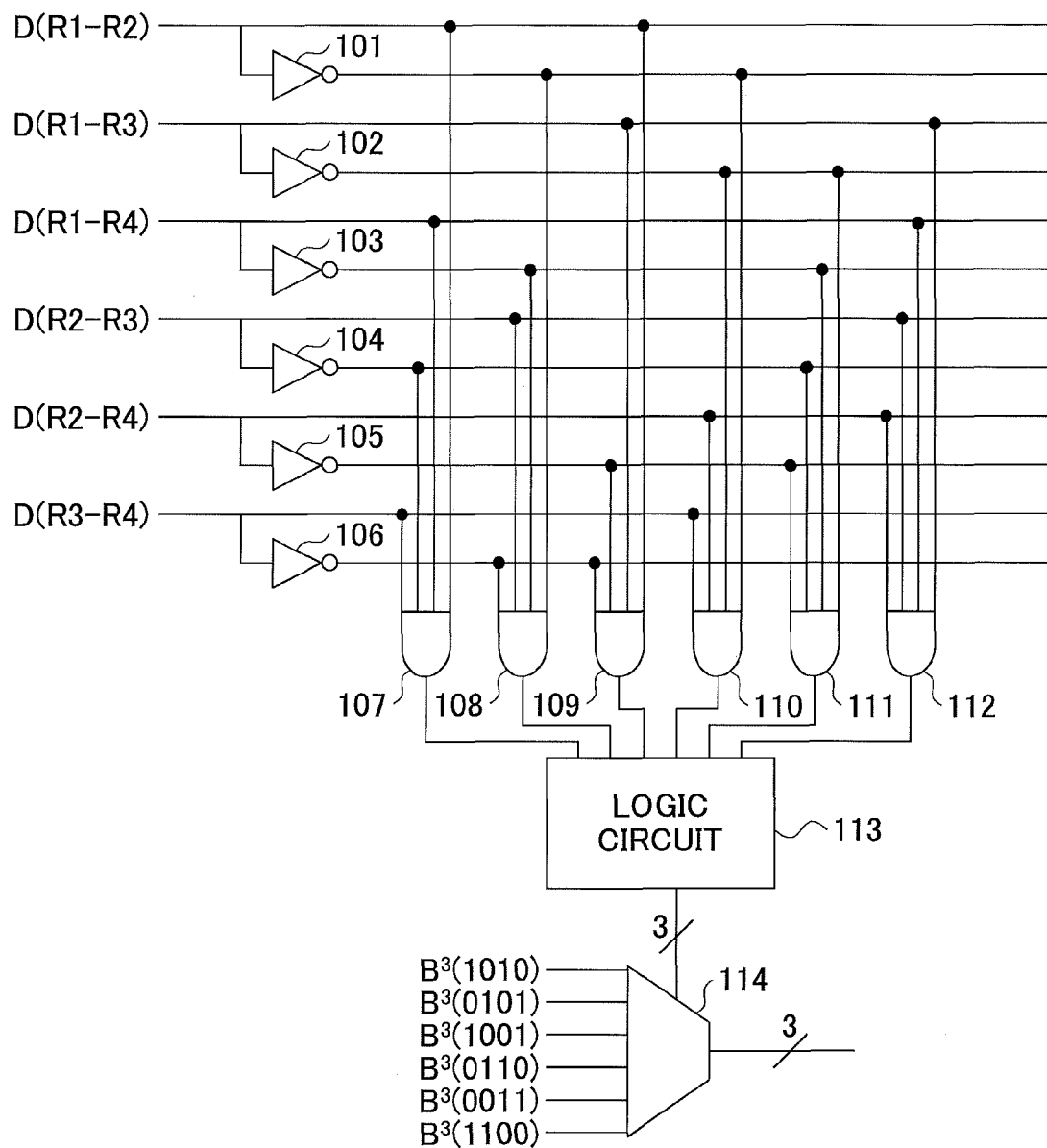
FIG. 15 is a drawing illustrating an example of the configuration of part of the receiving circuit.

FIG. 15 is a drawing illustrating an example of the configuration of part of the receiving circuit. FIG. 15 illustrates an example in the case of the number of binary signals being 4. Similarly to the transmitting circuit previously described, the configuration of the receiving circuit 12 is not limited to the circuit configuration for the case of the number of binary signals being 4, and may be designed to receive 2N (N: integer larger than or equal to two) binary signals.

The circuit illustrated in FIG. 15 identifies one bit pattern among the possible bit patterns of four binary signals based on the outputs of the differential comparators 60-1 through 60-6 illustrated in FIG. 10. The first-half circuit illustrated in FIG. 10 and the latter-half circuit illustrated in FIG. 15 together constitute a single receiving circuit. The circuit portion illustrated in FIG. 15 includes inverters 101 through 106, AND gates 107 through 112, a logic circuit 113, and a multiplexor 114. The inverters 101 through 106 and the AND gates 107 through 112 select one bit pattern among the possible bit patterns of four binary signals based on the results of detecting differential components. Specifically, the output of the AND gate corresponding to the selected bit pattern is set to HIGH. In this logic operation, the detection values "x" and "y" illustrated in the table of FIG. 13 are treated as a "don't care".

The logic circuit 113 generates a 3-bit selection signal responsive to the outputs of the AND gates 107 through 112. Based on the selection signal, the multiplexor 114 selects one of the 3-bit-wide data items corresponding to the possible bit patterns of the four binary signals, and outputs the selected 3-bit-wide data. The 3-bit-wide data items may be the same as or equivalent to the data OUTPUT_DATA2 illustrated in the table of FIG. 5. Alternatively, the multiplexor 114 may receive 4-bit-wide data items that are the same as the six possible patterns of the four binary signals, and may select and output one of the received data items in response to the above-noted selection signal.

Figure 16:
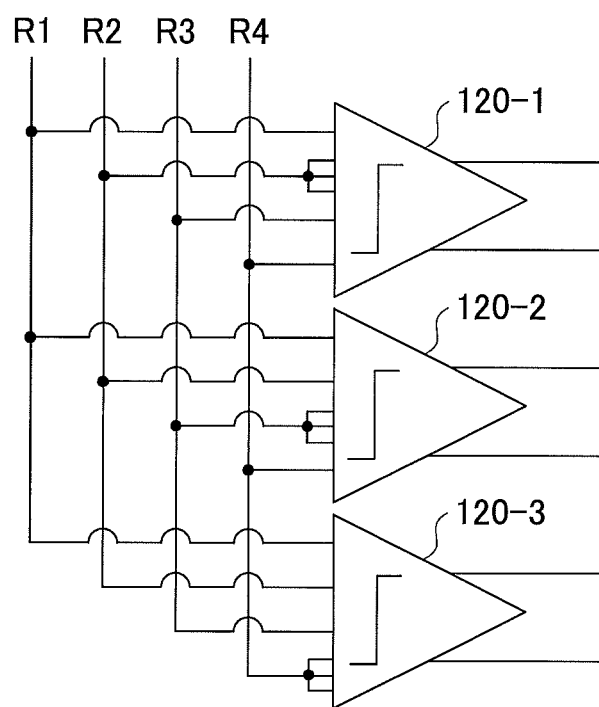
FIG. 16 is a drawing illustrating another example of the configuration of part of the receiving circuit.

FIG. 16 is a drawing illustrating another example of the configuration of part of the receiving circuit. FIG. 16 illustrates an example in the case of the number of binary signals being 4. The configuration of the receiving circuit 12 is not limited to the circuit configuration for the case of the number of binary signals being 4, and may be designed to receive 2N (N: integer larger than or equal to two) binary signals.

The part of the receiving circuit 12 illustrated in FIG. 16 includes differential comparators 120-1 through 120-3. Each of the differential comparators 120-1 through 120-3 receives the four received signals R1 through R4 received through the four signal transmission lines 3, and detects differential components between these two signals. The four binary signals previously described propagate through the signal transmission lines 3, and are received at the receiving end as the four received signals R1 through R4. The differential comparator 120-1, for example, detects the sum of a differential component between the received signal R2 and the received signal R1, a differential component between the received signal R2 and the received signal R3, and a differential component between the received signal R2 and the received signal R4. Further, the differential comparator 120-2, for example, detects the sum of a differential component between the received signal R3 and the received signal R1, a differential component between the received signal R3 and the received signal R2, and a differential component between the received signal R3 and the received signal R4.

Figure 17:
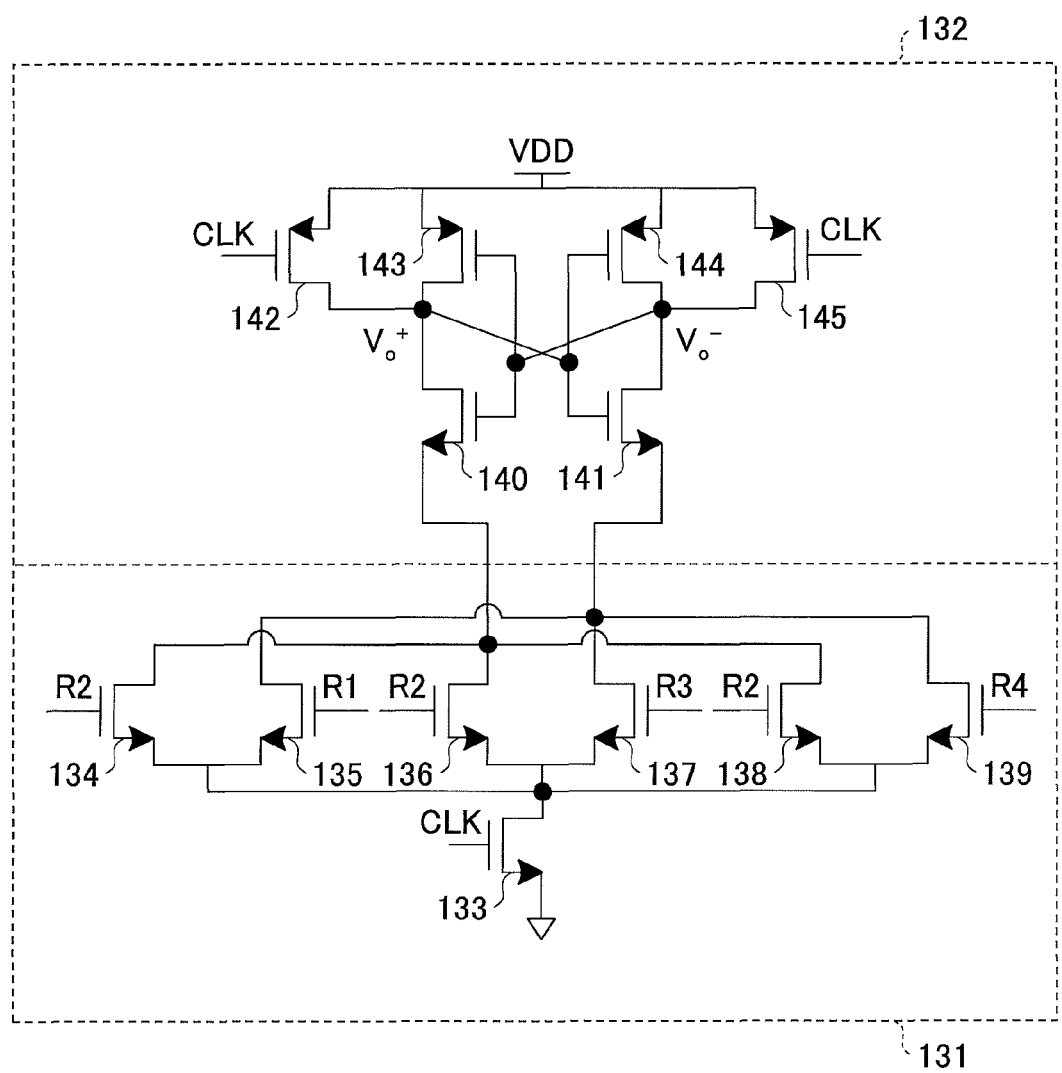
FIG. 17 is a drawing illustrating an example of the configuration of a differential comparator.

FIG. 17 is a drawing illustrating an example of the configuration of a differential comparator. The differential comparator illustrated in FIG. 17 is an example of the differential comparator 120-1 illustrated in FIG. 16. Each of the differential comparators 120-2 and 120-3 may have the same circuit configuration as the differential comparator illustrated in FIG. 17. The differential comparator illustrated in FIG. 17 includes a differential amplifier 131 and a latch 132. The differential amplifier 131 includes NMOS transistors 133 through 139. The latch 132 includes NMOS transistors 140 and 141 and PMOS transistors 142 through 145. The gates of the NMOS transistors 134 and 135 of the differential amplifier 131 receive the received signal R2 and the received signal R1, respectively. The gates of the NMOS transistors 136 and 137 of the differential amplifier 131 receive the received signal R2 and the received signal R3, respectively. Further, the gates of the NMOS transistors 138 and 139 of the differential amplifier 131 receive the received signal R2 and the received signal R4, respectively. The NMOS transistors 140 and 141 of the latch 132 have the drain nodes thereof whose voltages are output voltages $V_o+$ and $V_o-$, respectively. Namely, the sum of the voltage difference between the received signals R2 and R1, the voltage difference between the received signals R2 and R3, and the voltage difference between the received signals R2 and R4 is amplified and converted into a voltage having a decision value (i.e., detection value) of either "1" or "0", which is then output as the output voltages $V_o+$ and $V_o-$.

Figure 18:
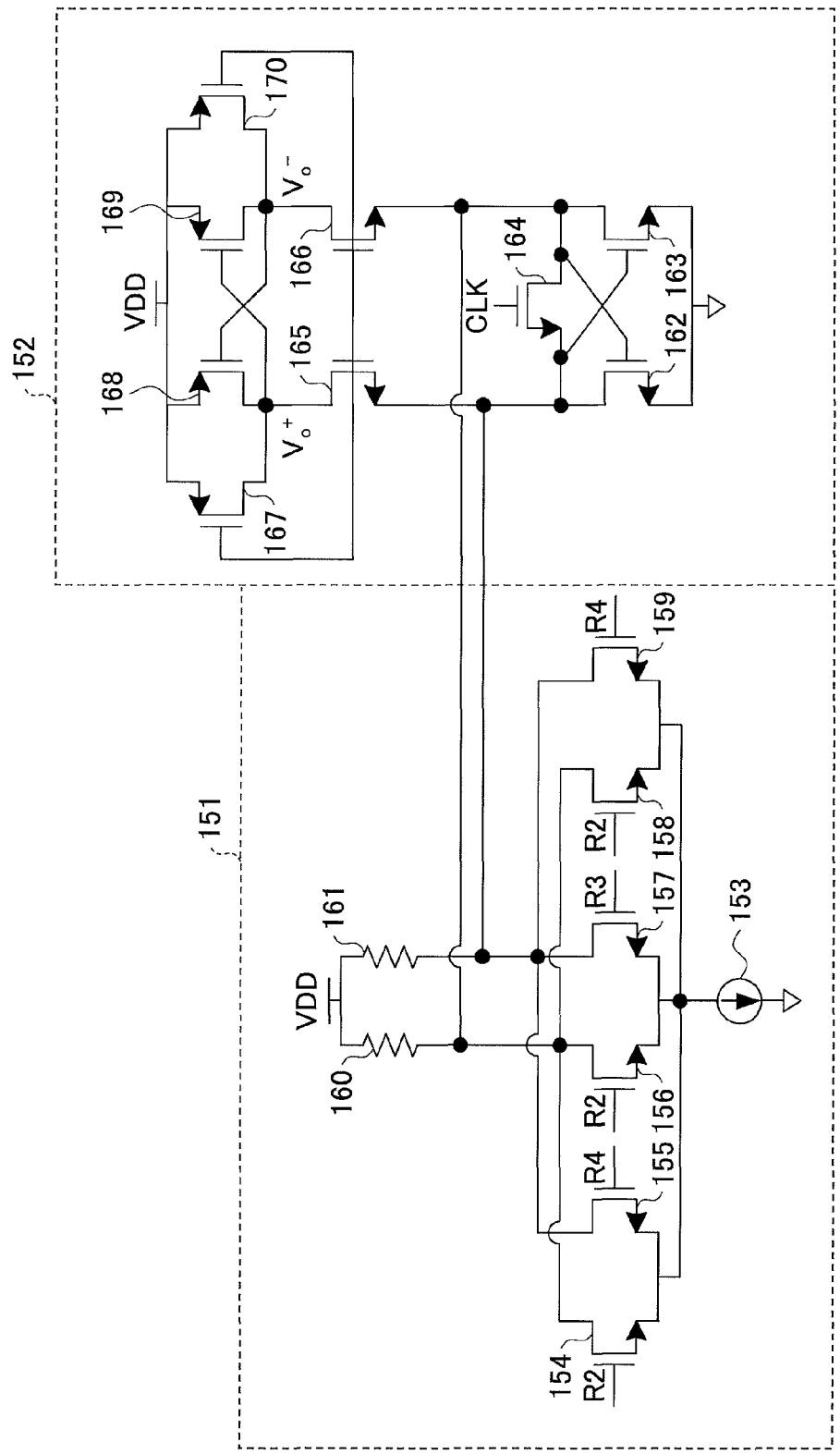
FIG. 18 is a drawing illustrating another example of the configuration of the differential comparator.

FIG. 18 is a drawing illustrating another example of the configuration of the differential comparator. The differential comparator illustrated in FIG. 18 includes a differential amplifier 151 and a latch 152. The differential amplifier 151 includes a constant current source 153, NMOS transistors 154 through 159, and resistors 160 and 161. The latch 152 includes NMOS transistors 162 through 166 and PMOS transistors 167 through 170. The gates of the NMOS transistors 154 and 155 of the differential amplifier 151 receive the received signal R2 and the received signal R1, respectively. The gates of the NMOS transistors 156 and 157 of the differential amplifier 151 receive the received signal R2 and the received signal R3, respectively. Further, the gates of the NMOS transistors 158 and 159 of the differential amplifier 151 receive the received signal R2 and the received signal R4, respectively. The NMOS transistors 165 and 166 of the latch 152 have the drain nodes thereof whose voltages are output voltages $V_o+$ and $V_o-$, respectively. Namely, the sum of the voltage difference between the received signals R2 and R1, the voltage difference between the received signals R2 and R3, and the voltage difference between the received signals R2 and R4 is amplified and converted into a voltage having a decision value (i.e., detection value) of either "1" or "0", which is then output as the output voltages $V_o+$ and $V_o-$.

FIG. 19 is a drawing illustrating a table used to identify one of a plurality of possible bit patterns of four binary signals in response to differential components between four received signals. In the table of FIG. 19, each of the second through fourth columns indicates the result of detecting the sum of three differential components, which are obtained between a signal of interest selected from the four received signals and the three remaining signals. For example, D[(R2−R1)+(R2−R3)+(R2−R4)] is the detection result obtained by the differential comparator 120-1 illustrated in FIG. 16 and either FIG. 17 or FIG. 18. Namely, the sum "(R2−R1)+(R2−R3)+(R2−R4)" of three differential components "(R2−R1)", "(R2−R3)", and "(R2−R4)", which are obtained between the signal of interest R2 and the three remaining signals R1, R3, and R4, is obtained by the differential comparator 120-1. Similarly, the sum of three differential components "(R3−R1)", "(R3−R2)", and "(R3−R4)", i.e., "(R3−R1)+(R3−R2)+(R3−R4)", is obtained by the differential comparator 120-2. Further, the sum of three differential components "(R4−R1)", "(R4−R2)", and "(R4−R3)", i.e., "(R4−R1)+(R4−R2)+(R4−R3)", is obtained by the differential comparator 120-3.

As the three detection values are obtained as described above, one bit pattern can be selected based on the table of FIG. 19 from the possible bit patterns of four binary signals among which the number of 0s and the number of 1s are equal to each other. For example, the fact that the detection values of the second through fourth columns in the table are "1", "1", and "−1", respectively, causes "0101" to be selected.

In this manner, one bit pattern among a plurality of possible bit patterns of the 2N binary signals among which the number of binary signals "0" and the number of binary signals "1" are equal to each other is detected in response to a plurality of differential components between 2N received signals. In this example, each of the differential components is the result of detecting the sum of 2N−1 differential components which are obtained between a signal of interest selected from the 2N received signals and the 2N−1 remaining signals. Namely, D[(R2−R1)+(R2−R3)+(R2−R4)] is the result of detecting the sum "(R2−R1)+(R2−R3)+(R2−R4)" of three differential components which are obtained between the signal of interest R2 and the three remaining signals R1, R3, and R4.

In comparison with the case in which the receiving circuit of FIG. 10 is used, the use of the receiving circuit of FIG. 15 ensures that the signal-to-noise ratio is increased, thereby achieving more reliable receiving operations. Details of this will be described in the following. The voltages of the received signals R1 and R3 are 1 V, and the voltages of the received signals R2 and R4 are −1 V, for example. Further, in-phase noise of 0.1 V is in existence. In the case of the receiving circuit illustrated in FIG. 10, the voltages of the differential components to be detected are 2 V (=R1−R2) and −2 V (R2−R3), for example. The signal-to-noise ratio in this case is 20 (=2/0.1). In the case of the receiving circuit illustrated in FIG. 15, the voltages of the differential components to be detected are 4 V (=(R3−R1)+(R3−R2)+(R3−R4)) and −4 V (=(R2−R1)+(R2−R3)+(R2−R4)), for example. The signal-to-noise ratio in this case is 40 (=4/0.1). The use of the receiving circuit of FIG. 15 enables the realization of receiving operations that are robust to noise.

FIG. 20 is a drawing illustrating the possible bit patterns of six binary signals, which is an example of 2N (N: integer that is two or larger) binary signals among which the number of 0s and the number of 1s are equal to each other. Although the above-described examples have been directed to the case in which the number of binary signals is four, the number of binary signals is not limited four. Six binary signals as illustrated in FIG. 20, for example, may be used in signal transmission. In the case of six binary signals being used, 20 bit patterns in total are in existence as illustrated in FIG. 20. The amount of information transmitted through the six signal transmission lines 3 is thus 4.3 (=$\log_2 20$) bits.

In the case of using 2N binary signals among which the number of 0s and the number of 1s are equal to each other, the number of possible bit patterns of the 2N binary signals is as follows.

$$(2N)!/(N!\cdot N!)$$

In the case of 2N being equal to 8, for example, there are 70 bit patterns in total. The amount of information transmitted through the eight signal transmission lines 13 is thus 6.13 (=$\log_2 70$) bits. In the case of transmitting conventional differential signals, the use of eight transmission signal lines enables the transmission of 4 (=8/2) bits. With eight signal transmission lines, thus, the signal transmission system of the disclosed technology enables an increase in bit rate by more than 50%, compared with the conventional differential-signal transmission system.

Further, the present invention is not limited to these embodiments, but various variations and modifications may be made without departing from the scope of the present invention.

According to at least one embodiment, a signal transmission system, a transmitting circuit, a receiving circuit, a signal transmitting method, and a signal receiving method are provided that enable the realization of high efficiency of signal transmission in a differential-component-based signal transmission system.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A signal transmission system, comprising:
    a transmitter configured to encode a transmission signal to generate 2N (N: integer larger than or equal to two) binary signals among which a number of 0s and a number of 1s are equal to each other, and to transmit the 2N binary signals;
    2N signal lines configured to transmit the 2N binary signals, respectively; and
    a receiver configured to detect a bit pattern among a plurality of possible bit patterns of the 2N binary signals in response to a plurality of differential components between 2N received signals received through the 2N signal lines, and to decode the detected bit pattern,
    wherein each of the differential components is a result of detecting a sum of 2N−1 differentials which are obtained between a signal of interest selected from the 2N received signals and 2N−1 remaining signals, and a total number of the differential components is fewer than 2N, the bit pattern being detected in response to the differential components that are fewer in number than the 2N received signals.

2. A receiver, comprising:
    a receiving circuit configured to detect a bit pattern among a plurality of possible bit patterns of 2N (N: integer larger than or equal to two) binary signals among which a number of 0s and a number of 1s are equal to each other, in response to a plurality of differential components between 2N received signals; and
    a decoder configured to decode the detected bit pattern,
    wherein each of the differential components is a result of detecting a sum of 2N−1 differentials which are obtained between a signal of interest selected from the 2N received signals and 2N−1 remaining signals, and a total number of the differential components is fewer than 2N, the bit pattern being detected in response to the differential components that are fewer in number than the 2N received signals.

3. A signal receiving method, performed by a receiver, comprising:
    detecting a bit pattern among a plurality of possible bit patterns of 2N (N: integer larger than or equal to two) binary signals among which a number of 0s and a number of 1s are equal to each other, in response to a plurality of differential components between 2N received signals; and
    decoding the detected bit pattern,
    wherein each of the differential components is a result of detecting a sum of 2N−1 differentials which are obtained between a signal of interest selected from the 2N received signals and 2N−1 remaining signals, and a total number of the differential components is fewer than 2N, the bit pattern being detected in response to the differential components that are fewer in number than the 2N received signals.

* * * * *